No. 701,663. Patented June 3, 1902.
A. W. ZIMMERMANN.
HAY RAKE.
(Application filed Sept. 3, 1901.)

(No Model.)

Witnesses: Inventor:
Wm Gordon Alexander W. Zimmermann
Wm Schroeder per Eugene Ayres,
Attorney.

UNITED STATES PATENT OFFICE.

ALEXANDER W. ZIMMERMANN, OF AMAZONIA, MISSOURI.

HAY-RAKE.

SPECIFICATION forming part of Letters Patent No. 701,663, dated June 3, 1902.

Application filed September 3, 1901. Serial No. 74,173. (No model.)

*To all whom it may concern:*

Be it known that I, ALEXANDER W. ZIMMERMANN, a citizen of the United States, residing at Amazonia, in the county of Andrew and State of Missouri, have invented certain new and useful Improvements in Hay-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in machines for gathering hay into windrows or cocks; and the principal objects of my improvements are, first, to provide a rake that is adapted for use in orchards, as well as on other ground used for meadows; second, to provide a rake by which the hay can be dumped either by a hand-lever or the feet operating on trips instead of by the hand only on a lever, and, third, to provide a rake in which the rake-head and its teeth are raised by a spring having connection with the front of the rake-head, assisted, if necessary, by a foot-lever.

Figure 1:
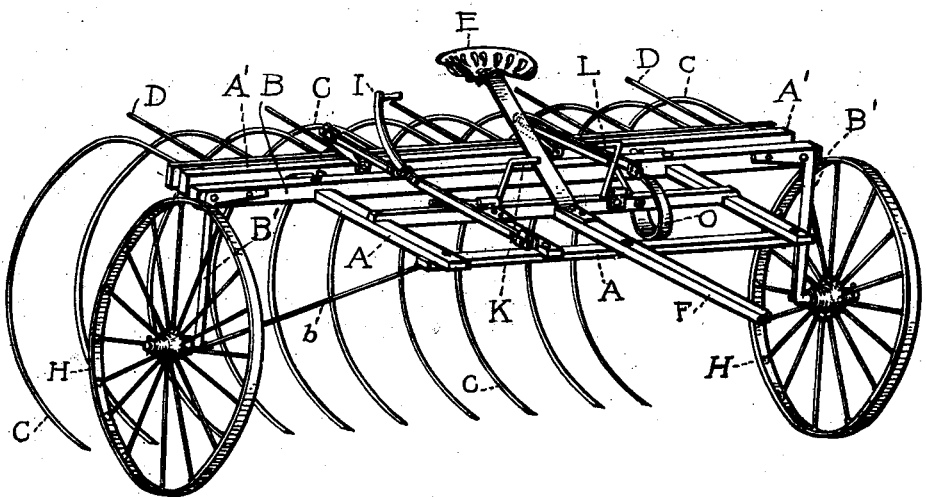
Figure 2:
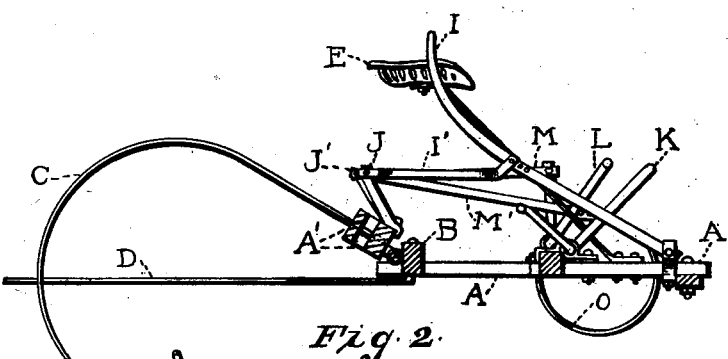
Figure 3:
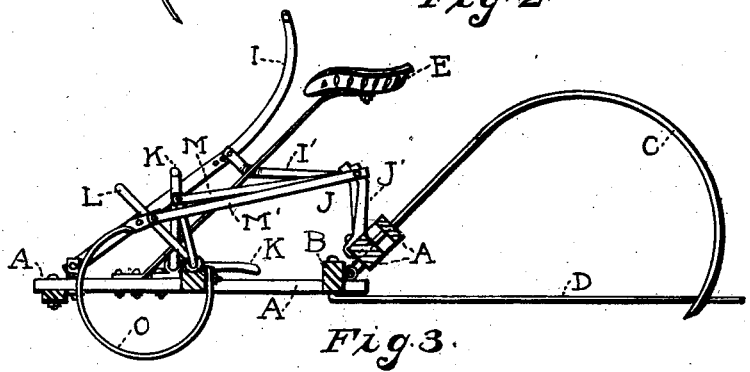

In the accompanying drawings, Figure 1 is a perspective view of the entire device; Fig. 2, a cross-section showing the hand-lever unlocked from the horizontally-inclined position in which it is shown in Fig. 1, but the rake-head with its teeth only partially lifted; and Fig. 3 a cross-section showing the rake-head and teeth sprung up in position to dump the hay by the power of the spring.

Similar letters designate corresponding parts in the figures of the drawings.

In the drawings, A A represent the parts of the frame of the rake; A', the rake-head; B, that part of the frame which also constitutes the axle; B' B', right-angular iron extensions rigidly attached to the ends of axle B to permit the use of small wheels, and *b b* represent stay-rods extending from B' B' to the front of frame A.

C C are the rake-teeth; D D, the hay-guards; E, the rake-seat; F, the tongue, and H H the wheels. As shown in Fig. 1, these wheels are one-half the height of those ordinarily used with hay-rakes, the tops only reaching to about the height of the rake-head, thus overcoming the difficulty heretofore experienced in the weakness of the high wheel and in raking and windrowing hay under trees in orchards, these wheels enabling the machine to rake up hay as close under the trees as the grass can be mowed. As wheels of the old style reach back flush with the rake-teeth, catching the hay with their spokes and elevating and wrapping it around the spindles, causing the wheels to run dry and wear out, I am enabled by the use of these small wheels to overcome this disadvantage also.

I is a hand-lever at the right hand of the driver, pivoted to the front of frame A.

J is an arm rigidly attached to the top of the rake-head. A connecting-rod I' is pivoted at one end to the upper end of arm J, its other end being pivoted in one of the three or more perforations near the middle of the lever I.

K is a foot-trip adapted to raise the lever, and L is a foot-lever located upon the opposite side of the seat and driver to aid, if necessary, in raising the rake head and teeth. An arm J', similar to arm J, is also attached to the rake-head. A connecting-bar M, pivoted to the lower upwardly-bent end of lever L, extends back to and is pivotally connected with arm J', while another connecting-bar M', also pivotally connected with said arm J', extends forward and forms pivotal connection with a spring O, the lower end of which is rigidly attached to the same crosspiece that carries the foot-trip and the foot-lever.

To operate the rake, the hand-lever is pressed down and the teeth held in position for gathering the hay, as shown in Fig. 1, and the teeth having gathered sufficient hay for a dump the occupant of the rake-seat unlocks the hand-lever by one hand or by pressing his right foot on trip K, thereby throwing the hand-lever up. If spring O is of sufficient strength and the rake-teeth are not entangled and held down by the hay, the rake-head, with its teeth, will at the same instant be carried up by the force of spring O into the position shown in Fig. 3 and the hay be thereby dumped into the windrow or cock; but if for any cause said spring fails to carry the rake head and teeth high enough and it remains in position similar to that shown in Fig. 2 the driver by pressing his left foot on foot-lever L, thereby assisting spring O, can instantly carry the teeth to the position shown in Fig. 3 and insure the dumping of the hay.

What I claim, and desire to secure by Letters Patent, is—

1. The combination with the frame of a hay-rake, of a rake-head and its teeth and the hay-guards, an axle, the right-angular extensions of said axle and the wheels whose peripheries reach only to the height of the rake-head, carried by said extensions, an arm rigidly attached to the top of the rake-head, a hand-lever in front of said arm and the rod forming pivotal connection between said lever and said arm, said lever and rod forming a locking-toggle, a foot-trip adapted to unlock said toggle, a duplicate arm rigidly attached to the top of the rake-head, the spring carried by said frame, the bar forming pivotal connection between said duplicate arm and spring, the foot-lever and its upwardly-turned lower end and the duplicate bar forming pivotal connection between the foot-lever and the duplicate arm, substantially as described.

2. The combination with the frame and head of a hay-rake of an arm rigidly fastened to the top of the rake-head, a hand-lever forward thereof, a rod making pivotal connection between said rake-head arm and said hand-lever, said lever and rod forming a locking-toggle, a foot-trip adapted to unlock said toggle, a foot-lever, an arm backward thereof on said rake-head and a spring forward of said last-named arm having its lower end rigidly attached to the front cross-piece of the frame, a bar having pivotal connection with the upper end of said spring and with the arm back of said spring and a bar also pivotally connected at its rear end to said arm and at its forward end to said foot-lever, substantially as described and set forth.

3. In a hay-rake a spring adapted to raise the rake-head and its teeth having its lower end rigidly attached to a cross-piece of the frame, an arm rigidly attached on the rake-head, a (bar forming pivotal connection between said spring and arm, and a foot-lever at the side of said spring and a bar pivotally connecting said foot-lever with said arm and adapted to assist the spring, substantially as described and for the purpose specified.

4. The combination with the frame, seat, rake-head, teeth, guards and wheels of a hay-rake, of an arm rigidly attached to the rake-head, a foot-lever pivotally attached to a cross-piece near the front of the frame and having a lower upwardly-bent end, a bar pivotally attached at one end to the upwardly-bent lower end of said foot-lever and at its other end to said arm, a spring having its lower end rigidly attached to said cross-piece, and a bar also having one end pivotally attached to said arm and its other end attached to the upper end of said spring, said spring and its connections being adapted to automatically raise the rake-head and its teeth, substantially as described.

In testimony whereof I affix my signature in presence of two witnesses.

ALEXANDER W. ZIMMERMANN.

Witnesses:
ANDY. B. KERR,
WILLIE CROOKS.